United States Patent
Besenmatter et al.

[11] 3,942,874
[45] Mar. 9, 1976

[54] PANCRATIC WIDE-ANGLE OBJECTIVE

[75] Inventors: Walter Besenmatter; Trude Muszumanski, both of Vienna; Gunter Kurz, Vosendorf, all of Austria

[73] Assignees: Karl Vockenhuber; Raimund Hauser, both of Vienna, Austria; part interest to each

[22] Filed: Feb. 14, 1974

[21] Appl. No.: 442,433

[30] Foreign Application Priority Data
Mar. 1, 1973  Austria .............................. 1810/73

[52] U.S. Cl. ................................ 350/184; 350/186
[51] Int. Cl.² ........................................ G02B 15/00
[58] Field of Search ............................. 350/184, 186

[56] References Cited
UNITED STATES PATENTS
3,597,048    8/1971    Bertele ................................. 350/184

*Primary Examiner*—John K. Corbin
*Assistant Examiner*—Conrad Clark
*Attorney, Agent, or Firm*—Ernest G. Montague; Karl F. Ross; Herbert Dubno

[57] ABSTRACT

A pancratic wide-angle objective comprises a stationary negative front component in the form of a single meniscus with a convex forward surface, an axially movable intermediate component consisting of a biconvex lens, and a stationary multilens positive rear component separated from the front component by an airspace greater than the focal length of the latter. The individual focal lengths of the front, intermediate and rear components have absolute values in a ratio of approximately 4:5:3.

8 Claims, 1 Drawing Figure

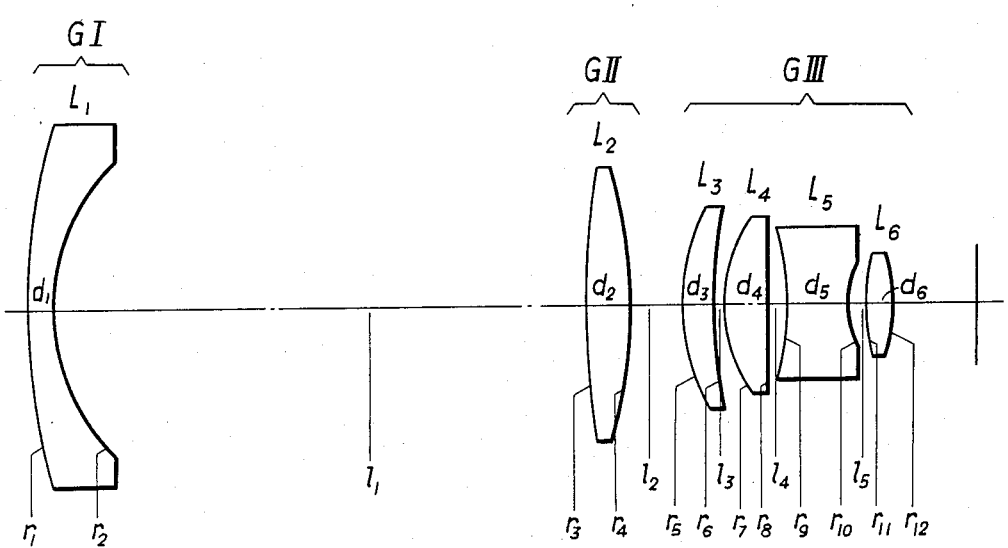

PANCRATIC WIDE-ANGLE OBJECTIVE

BACKGROUND OF THE INVENTION

The invention relates to a powerful pancratic wide angle projection objective of the type described in Swiss Pat. No. 522,230. This patent describes an objective with a negative front component and a positive rear component between which, for the variation of the focal length, a further positive lens member is axially movable. The shortest focal length of this objective is a multiple of the diagonal of the image to be projected.

OBJECTS OF THE INVENTION

It is a primary object of the invention to provide an optical system adapted to focus an objective of the width of the Super-8 format within short distances such as 250 – 500 mm onto an image screen.

It is a further object of the invention to provide an optical system for projecting a Super-8 image frame within a distance of about 500 mm, with a 300-mm image width.

SUMMARY OF THE INVENTION

We have found, in accordance with the present invention, that the foregoing objects can be realized by designing the negative front component as a meniscus-shaped lens member with a concave surface turned toward the intermediate component and with an absolute focal length greater than that of the rear component but less than that of the intermediate component. The airspace separating the front and rear components advantageously exceeds the focal length of the front component and equals approximately twice the focal length of the rear component. A pronounced wide-angle effect results from this construction; the minimum overall focal length is shorter than or, at most, equal to the image diagonal $2y'$.

BRIEF DESCRIPTION OF THE DRAWING

The above and other features of our invention will be described in greater detail with reference to the accompanying drawing the sole FIGURE of which schematically illustrates an objective according to our invention in a position of intermediate overall focal length $f_M$.

SPECIFIC DESCRIPTION

The objective shown in the drawing consists of three distinct components, namely a negative front component GI, an axially movable positive intermediate component GII and a stationary positive rear component GIII. Component GI, positioned on the side of the longer conjugate intercept distance normally referred to as the object side, is a single lens $L_1$ of thickness $d_1$ and radii $r_1$, $r_2$ in the form of a negative meniscus with a convex forward surface. A variable airspace $l_1$ separates this lens from a biconvex lens $L_2$ constituting the positive intermediate component, lens $L_2$ having a thickness $d_2$ and radii $r_3$, $r_4$. Another variable airspace $l_2$, considerably smaller than airspace $l_1$ in all operating positions of the objective, intervenes between lens $L_2$ and a positive first lens $L_3$ (thickness $d_3$ and radii $r_5$, $r_6$) of rear component GIII; the other members of this component are a positive second lens $L_4$ (thickness $d_4$ and radii $r_7$, $r_8$), a negative third lens $L_5$ (thickness $d_5$ and radii $r_9$, $r_{10}$) and a positive fourth lens $L_6$ (thickness $d_6$ and radii $r_{11}$, $r_{12}$). The lens $L_3 - L_6$ are separated by airspaces $l_3$, $l_4$ and $l_5$. Lens $L_6$ lies closest to a film whose frames are to be projected upon a nonillustrated screen on the object side.

Representative numerical values for the radii $r_1 - r_{12}$, the thicknesses $d_1 - d_6$ and the separations $l_1 - l_5$, based on a numerical value of unity for the minimum overall focal length $f_{min}$, are given for three Examples in the following Tables, together with the refractive indices $n_d$ and Abbe numbers $v_d$.

EXAMPLE I

| | | | | | | $n_d$ | | $v_d$ |
|---|---|---|---|---|---|---|---|---|
| $L_1$ | $r_1$ | + | 7.072 | $d_1$ | 0.229 | 1.658 | / | 50.9 |
| | $r_2$ | + | 1.972 | | | | | |
| | | | | $l_1$ | 5.530 | $f_{min}$ | | |
| | | | | | 5.102 | $f_M$ | | |
| | | | | | 4.516 | $f_{max}$ | | |
| $L_2$ | $r_3$ | + | 8.596 | $d_2$ | 0.457 | 1.589 | / | 61.3 |
| | $r_4$ | − | 4.856 | | | | | |
| | | | | $l_2$ | 0.014 | $f_{min}$ | | |
| | | | | | 0.443 | $f_M$ | | |
| | | | | | 1.029 | $f_{max}$ | | |
| $L_3$ | $r_5$ | + | 2.137 | $d_3$ | 0.372 | 1.589 | / | 61.3 |
| | $r_6$ | + | 14.894 | | | | | |
| | | | | $l_3$ | 0.014 | | | |
| $L_4$ | $r_7$ | + | 1.425 | $d_4$ | 0.500 | 1.589 | / | 61.3 |
| | $r_8$ | | ∞ | | | | | |
| | | | | $l_4$ | 0.104 | | | |
| $L_5$ | $r_9$ | − | 5.597 | $d_5$ | 0.643 | 1.785 | / | 25.8 |
| | $r_{10}$ | + | 0.768 | | | | | |
| | | | | $l_5$ | 0.121 | | | |
| $L_6$ | $r_{11}$ | + | 4.705 | $d_6$ | 0.286 | 1.691 | / | 54.7 |
| | $r_{12}$ | − | 1.364 | | | | | |

| | |
|---|---|
| $f_{min}$ | 1.000 |
| $f_M$ | 1.087 |
| $f_{max}$ | 1.216 |
| $2_y'$ | 1.000 |
| aperture ratio | 1:1.3 |

EXAMPLE II

| | | | | | | $n_d$ | | $v_d$ |
|---|---|---|---|---|---|---|---|---|
| $L_1$ | $r_1$ | + | 14.316 | $d_1$ | 0.286 | 1.589 | / | 61.3 |
| | $r_2$ | + | 1.960 | | | | | |
| | | | | $l_1$ | 5.497 | $f_{min}$ | | |
| | | | | | 5.011 | $f_M$ | | |
| | | | | | 4.524 | $f_{max}$ | | |
| $L_2$ | $r_3$ | + | 5.234 | $d_2$ | 0.458 | 1.589 | / | 61.3 |
| | $r_4$ | − | 7.490 | | | | | |
| | | | | $l_2$ | 0.058 | $f_{min}$ | | |
| | | | | | 0.545 | $f_M$ | | |
| | | | | | 1.032 | $f_{max}$ | | |
| $L_3$ | $r_5$ | + | 2.434 | $d_3$ | 0.344 | 1.589 | / | 61.3 |
| | $r_6$ | + | 33.380 | | | | | |
| | | | | $l_3$ | 0.014 | | | |
| $L_4$ | $r_7$ | + | 1.507 | $d_4$ | 0.558 | 1.589 | / | 61.3 |
| | $r_8$ | ∞ | | | | | | |
| | | | | $l_4$ | 0.106 | | | |
| $L_5$ | $r_9$ | − | 5.485 | $d_5$ | 0.573 | 1.785 | / | 26.1 |
| | $r_{10}$ | + | 0.888 | | | | | |
| | | | | $l_5$ | 0.129 | | | |
| $L_6$ | $r_{11}$ | + | 3.800 | $d_6$ | 0.315 | 1.691 | / | 54.7 |
| | $r_{12}$ | − | 1.722 | | | | | |

$f_{min}$ 1.000
$f_M$ 1.102
$f_{max}$ 1.217
$2y'$ 1.000
Aperture ratio 1:1.3

EXAMPLE III

| | | | | | | $n_d$ | | $v_d$ |
|---|---|---|---|---|---|---|---|---|
| $L_1$ | $r_1$ | + | 13.048 | $d_1$ | 0.255 | 1.589 | / | 51.4 |
| | $r_2$ | + | 2.107 | | | | | |
| | | | | $l_1$ | 5.452 | | | |
| | | | | | 4.956 | | | |
| | | | | | 4.459 | | | |
| $L_2$ | $r_3$ | + | 5.226 | $d_2$ | 0.454 | 1.589 | / | 61.3 |
| | $r_4$ | − | 7.480 | | | | | |
| | | | | $l_2$ | 0.050 | | | |
| | | | | | 0.547 | | | |
| | | | | | 1.043 | | | |
| $L_3$ | $r_5$ | + | 2.282 | $d_3$ | 0.369 | 1.589 | / | 61.3 |
| | $r_6$ | + | 31.295 | | | | | |
| | | | | $l_3$ | 0.014 | | | |
| $L_4$ | $r_7$ | + | 1.412 | $d_4$ | 0.496 | 1.589 | / | 61.3 |
| | $r_8$ | ∞ | | | | | | |
| | | | | $l_4$ | 0.099 | | | |
| $L_5$ | $r_9$ | − | 5.555 | $d_5$ | 0.638 | 1.785 | / | 26.1 |
| | $r_{10}$ | + | 0.755 | | | | | |
| | | | | $l_5$ | 0.135 | | | |
| $L_6$ | $r_{11}$ | + | 3.444 | $d_6$ | 0.284 | 1.691 | / | 54.7 |
| | $r_{12}$ | − | 1.376 | | | | | |

$f_{min}$ 1.000
$f_M$ 1.102
$f_{max}$ 1.216
$2y'$ 1.000
Aperture ratio 1:1.3

From the foregoing values the individual focal lengths $f_I$, $f_{II}$ and $f_{III}$ of components GI, GII and GIII can be calculated as follows:

| EXAMPLE | $f_I$ | $f_{II}$ | $f_{III}$ |
|---|---|---|---|
| I | −4.12 | +5.35 | +2.934 |
| II | −3.89 | +5.28 | +3.025 |
| III | −4.21 | +5.28 | +2.789 |

It will thus be seen that the individual focal lengths $f_I$, $f_{II}$ and $f_{III}$ of components GI, GII, GIII have absolute values approximately in the ratio of $f_I:f_{II}:f_{III} = 4:5:3$ in all three instances. The minimum focal length $f_{min}$ is about one-third of the individual focal length $f_{III}$.

It will also be noted from the Tables that the range of displacement of intermediate component GII between its positions of minimum overall focal length $f_{min}$ and maximum overall focal length $f_{max}$ is in each case approximately equal to unity, and thus to the minimum focal length $f_{min}$, with the first variable airspace $l_1$ substantially greater than the second variable airspace $l_2$ at both ends of the range.

What is claimed is:
1. A pancratic wide-angle objective comprising:
   a stationary negative front component;
   a stationary multilens positive rear component; and
   an axially movable positive intermediate component between said front and rear components;

said front component being a meniscus-shaped lens member with a concave surface turned toward said intermediate component and with an absolute focal length greater than that of said rear component;
said intermediate component being a biconvex lens member with a focal length greater than the absolute focal length of said front component, the absolute focal lengths of said front component, said intermediate component and said rear component having a ratio of approximately 4:5:3.

2. An objective as defined in claim 1 wherein said front and rear components are separated by an airspace greater than the focal length of said front component.

3. An objective as defined in claim 2 wherein said airspace equals approximately twice the focal length of said rear component.

4. An objective as defined in claim 1 wherein the separation of said intermediate component from said front component substantially exceeds its separation from said rear component at both ends of its range of displacement.

5. An objective as defined in claim 1 wherein said front component is a single lens $L_1$, said intermediate component is a signal lens $L_2$ and said rear component consists of a positive first lens $L_3$, a positive second lens $L_4$, a negative third lens $L_5$ and a positive fourth lens $L_6$.

6. An objective as defined in claim 5 wherein said lenses $L_1 - L_6$ have thicknesses $d_1 - d_6$, radii $r_1 - r_{12}$ and separations $l_1 - l_5$ whose numerical values, together with their refractive indices $n_d$ and Abbe numbers $v_d$, are substantially as given in the following Table:

| Lenses | Radii | | Thicknesses and Separations | | $n_d$ | $v_d$ |
|---|---|---|---|---|---|---|
| $L_1$ | $r_1$ | + 7.072 | $d_1$ | 0.229 | 1.658 | 50.9 |
| | $r_2$ | + 1.972 | | | | |
| | | | $l_1$ | 5.530 $f_{min}$ | | |
| | | | | 5.102 $f_M$ | | |
| | | | | 4.516 $f_{max}$ | | |
| $L_2$ | $r_3$ | + 8.596 | $d_2$ | 0.457 | 1.589 | 61.3 |
| | $r_4$ | − 4.856 | | | | |
| | | | $l_2$ | 0.014 $f_{min}$ | | |
| | | | | 0.443 $f_M$ | | |
| | | | | 1.029 $f_{max}$ | | |
| $L_3$ | $r_5$ | + 2.137 | $d_3$ | 0.372 | 1.589 | 61.3 |
| | $r_6$ | + 14.894 | | | | |
| | | | $l_3$ | 0.014 | | |
| $L_4$ | $r_7$ | + 1.425 | $d_4$ | 0.500 | 1.589 | 61.3 |
| | $r_8$ | ∞ | | | | |
| | | | $l_4$ | 0.104 | | |
| $L_5$ | $r_9$ | − 5.597 | $d_5$ | 0.643 | 1.785 | 25.8 |
| | $r_{10}$ | + 0.768 | | | | |
| | | | $l_5$ | 0.121 | | |
| $L_6$ | $r_{11}$ | + 4.705 | $d_6$ | 0.286 | 1.691 | 54.7 |
| | $r_{12}$ | − 1.364 | | | | |

7. An objective as defined in claim 5 wherein said lenses $L_1 - L_6$ have thicknesses $d_1 - d_6$, radii $r_1 - r_{12}$ and separations $l_1 - l_5$ whose numerical values, together with their refractive indices $n_d$ and Abbe numbers $v_d$, are substantially as given in the following Table:

| Lenses | Radii | | Thicknesses and Separations | | $n_d$ | $v_d$ |
|---|---|---|---|---|---|---|
| $L_1$ | $r_1$ | +14.316 | $d_1$ | 0.286 | 1.589 | 61.3 |
| | $r_2$ | + 1.960 | | | | |
| | | | $l_1$ | 5.497 $f_{min}$ | | |
| | | | | 5.011 $f_M$ | | |
| | | | | 4.524 $f_{max}$ | | |
| $L_2$ | $r_3$ | + 5.234 | $d_2$ | 0.458 | 1.589 | 61.3 |
| | $r_4$ | − 7.490 | | | | |
| | | | $l_2$ | 0.058 $f_{min}$ | | |
| | | | | 0.545 $f_M$ | | |
| | | | | 1.032 $f_{max}$ | | |
| $L_3$ | $r_5$ | + 2.434 | $d_3$ | 0.344 | 1.589 | 61.3 |
| | $r_6$ | +33.380 | | | | |
| | | | $l_3$ | 0.014 | | |
| $L_4$ | $r_7$ | + 1.507 | $d_4$ | 0.558 | 1.589 | 61.3 |
| | $r_8$ | ∞ | | | | |
| | | | $l_4$ | 0.106 | | |
| $L_5$ | $r_9$ | − 5.485 | $d_5$ | 0.573 | 1.785 | 26.1 |
| | $r_{10}$ | + 0.888 | | | | |
| | | | $l_5$ | 0.129 | | |
| $L_6$ | $r_{11}$ | + 3.800 | $d_6$ | 0.315 | 1.691 | 54.7 |
| | $r_{12}$ | − 1.722 | | | | |

8. An objective as defined in claim 5 wherein said lenses $L_1 - L_6$ have thicknesses $d_1 - d_6$, radii $r_1 - r_{12}$ and separations $l_1 - l_5$ whose numerical values, together with their refractive indices $n_d$ and Abbe numbers $v_d$, are substantially as given in the following Table:

| Lenses | Radii | | Thicknesses and Separations | | $n_d$ | $v_d$ |
|---|---|---|---|---|---|---|
| $L_1$ | $r_1$ | +13.048 | $d_1$ | 0.255 | 1.589 | 51.4 |
| | $r_2$ | + 2.107 | | | | |
| | | | $l_1$ | 5.452 | | |
| | | | | 4.956 | | |
| | | | | 4.459 | | |
| $L_2$ | $r_3$ | + 5.226 | $d_2$ | 0.454 | 1.589 | 61.3 |
| | $r_4$ | − 7.480 | | | | |
| | | | $l_2$ | 0.050 | | |
| | | | | 0.547 | | |
| | | | | 1.043 | | |
| $L_3$ | $r_5$ | + 2.282 | $d_3$ | 0.369 | 1.589 | 61.3 |
| | $r_6$ | +31.295 | | | | |
| | | | $l_3$ | 0.014 | | |
| $L_4$ | $r_7$ | + 1.412 | $d_4$ | 0.496 | 1.589 | 61.3 |
| | $r_8$ | ∞ | | | | |
| | | | $l_4$ | 0.099 | | |
| $L_5$ | $r_9$ | − 5.555 | $d_5$ | 0.638 | 1.785 | 26.1 |
| | $r_{10}$ | + 0.755 | | | | |
| | | | $l_5$ | 0.135 | | |
| $L_6$ | $r_{11}$ | + 3.444 | $d_6$ | 0.284 | 1.691 | 54.7 |
| | $r_{12}$ | − 1.376 | | | | |

* * * * *